US010721874B2

(12) United States Patent
Uglialoro

(10) Patent No.: US 10,721,874 B2
(45) Date of Patent: Jul. 28, 2020

(54) FLOWER DELIVERY APPARATUS AND METHOD

(71) Applicant: Michael J. Uglialoro, Clearwater, FL (US)

(72) Inventor: Michael J. Uglialoro, Clearwater, FL (US)

(*) Notice: Subject to any disclaimer, the term of this patent is extended or adjusted under 35 U.S.C. 154(b) by 500 days.

(21) Appl. No.: 15/634,321

(22) Filed: Jun. 27, 2017

(65) Prior Publication Data

US 2017/0367272 A1 Dec. 28, 2017

Related U.S. Application Data

(60) Provisional application No. 62/355,088, filed on Jun. 27, 2016.

(51) Int. Cl.
| | |
|---|---|
| *B65D 85/52* | (2006.01) |
| *A01G 5/06* | (2006.01) |
| *B42D 15/02* | (2006.01) |
| *A01G 9/02* | (2018.01) |
| *G06K 7/10* | (2006.01) |
| *G06Q 30/06* | (2012.01) |
| *B65D 85/50* | (2006.01) |

(52) U.S. Cl.
CPC ............. *A01G 5/06* (2013.01); *A01G 9/02* (2013.01); *A01G 9/028* (2013.01); *B42D 15/02* (2013.01); *B65D 85/505* (2013.01); *G06K 7/10297* (2013.01); *G06Q 30/0621* (2013.01); *G06Q 30/0635* (2013.01)

(58) Field of Classification Search
CPC ........ B65D 85/505; B65D 85/62; A01G 5/06; A01G 9/02; A01G 9/028

USPC ....... 206/423, 499, 557, 562, 563; 47/41.01, 47/41.13, 41.15
See application file for complete search history.

(56) References Cited

U.S. PATENT DOCUMENTS

| | | | | |
|---|---|---|---|---|
| 2,763,134 A * | 9/1956 | McDonald | ............. | A01G 5/06 62/331 |
| 3,180,288 A * | 4/1965 | McCowan | ......... | A47B 87/0246 108/101 |
| 3,883,990 A * | 5/1975 | Stidolph | ................. | A01G 5/00 47/41.01 |
| 5,271,520 A * | 12/1993 | McAfee | ................ | A01K 97/06 206/315.11 |
| 5,912,033 A * | 6/1999 | Ferguson | ............... | B65D 25/02 220/507 |

(Continued)

OTHER PUBLICATIONS https://maisondesfleurs.com—screenshot taken from the website in mid-2016 Jun. 2016.

*Primary Examiner* — Luan K Bui
(74) *Attorney, Agent, or Firm* — William G. Giltinan; Carlton Fields, P.A.

(57) ABSTRACT

An apparatus, method and system for use in the shipment, delivery, and display of flowers. The apparatus comprises a preferably translucent enclosure with a lid, housing a removable tray assembly. The removable trays have aligned openings for the insertion of flower stems. The enclosure itself is configured to be stacked conveniently on a pallet for bulk shipment and delivery. The system and method comprise providing an interface for users to order flowers contained in the enclosure and delivering the enclosure with a customized multimedia electronic greeting.

5 Claims, 9 Drawing Sheets

(56) References Cited

U.S. PATENT DOCUMENTS

| | | | | |
|---|---|---|---|---|
| 2001/0035364 A1* | 11/2001 | Weder | ................... | B65D 81/05 |
| | | | | 206/423 |
| 2007/0089361 A1* | 4/2007 | Weder | ................... | A47G 7/063 |
| | | | | 47/41.01 |
| 2011/0094901 A1* | 4/2011 | Ingvardsen | ............ | B25H 3/026 |
| | | | | 206/216 |

* cited by examiner

FLOWER DELIVERY APPARATUS AND METHOD

This application claims priority to U.S. Provisional application Ser. No. 62/355,088 filed Jun. 27, 2016, which is hereby incorporated by reference in its entirety.

BACKGROUND

This present invention relates in general to apparatuses, systems and methods used in the transport, delivery and display of flowers and accompanying messages or greetings between the sender and recipient. Flower containers, such as boxes and vases, have long been used to display flowers in various settings, including indoors and outdoors. When using such containers, transportation typically occurs with flowers packed in cardboard boxes. Delivery occurs after a retailer unpacks the boxes and transfers flowers to a display apparatus such as a vase or display box. While vases typically provide an aesthetically pleasing appearance suitable for the flowers to be received as a gift, they are not suitable for long-distance transportation, meaning that additional labor to unpack flowers and fill the vase is required.

Some types of flowers, due to their structure, require specific styles of containers to best support their requirements and appearance. Further, with vases being commonplace in households and the market in general, it gives cause to grow flowers to a certain height (typically 30 cm-40 cm) in order to be presented in a typical vase. For example, long stem roses or other long stem flowers require a taller container, and the container often needs to be narrow at the top to keep the flowers organized and bunched together. The result is that growers seek to provide long-stem flowers suitable for vases while shorter-stem flowers are considered less valuable or waste. Lastly, while vases can be reused after the shipment of flowers perishes, the options for reuse for any purpose other than displaying flowers are limited or non-existent.

Known flower containers thus suffer from a number of inherent drawbacks. As is noted above, a typical flower vase may be adequate for certain aesthetic qualities, but the shape of a vase does not facilitate, nor provide for, simple and efficient shipment or delivery and provides limited reuse options. Boxes, while sometimes aesthetically pleasing and shaped more conveniently for shipping are not well suited to sustaining flowers due to the requirements for water or soil. To address that need, an individual water supply for each stem is sometimes used but is a wasteful and labor-intensive solution. The long stems of some flowers also make shipping less efficient due to the requirement for longer containers. In addition, shipment from growers to retail or other vendors may often be in bulk with the flowers bundled in a box or in bales that necessitate removal and assembly into an aesthetically-pleasing display by a retailer prior to delivery to an end user.

To further complicate matters, flowers delivered to designated individuals as gifts on special occasions are intended to arrive at their location already arranged aesthetically in a container. For this reason, vases and other open top containers are typically used. But such containers are only suitable for same-day type delivery of flowers and are difficult to pack and transport. The shape and open nature of a vase creates a need for flowers to be "handled with care" which creates a need for special handling which is typically fulfilled by local florists instead of a commercial carrier. The opening in the vase is also such that spillage is likely unless a hydrated foam material is used inside the vase.

More recently, with the rise of the Internet and e-commerce, different delivery models have developed for a variety of goods, including perishable goods. Such models, however, are still less than ideal for flower delivery. Business models from online retailers have arisen where flowers are shipped in boxes through traditional parcel services such as UPS or FedEx. However, these current providers typically transport flowers to a gift recipient packed in corrugated box material, and the flowers and associated vase or container are sold as a kit which requires the customer to unpackage the contents, unwrap the items, and assemble the flowers and container into an arrangement before presenting the arrangement to the intended recipient. This model provides the convenience and cost benefits of e-commerce but requires the "some assembly required" effort by the customer upon receiving the package, and provides a less-than-ideal user experience for the recipient.

Additionally, both traditional, local florist delivery and e-commerce delivery-based flower options often offer limited greeting card choices with few ways to create a truly personalized experience. The text and font of a particular card may be customized, but the typical printed cards are generic and lack the personal and intimate feel of a personalized message.

There is, therefore, a need for an improved shipping, transport and delivery container, method and system that facilitate use of shorter stem flowers, more efficient transportation and delivery with little or no assembly required, an aesthetically pleasing flower display with multiple re-purposing options, and more robust messaging options.

SUMMARY

Disclosed herein are a flower container assembly and a system and method for ordering flowers. The apparatus comprises a preferably (but not exclusively) rectangular enclosure with one open face. A removable lid is adapted to cover the open face, and a removable tray assembly is adapted to fit within the enclosure. The removable tray assembly preferably has an upper tray and a lower tray, spatially separated from one another, but one-tray and multi-tray options are possible. The upper tray and lower tray comprise a plurality of aligned openings adapted to be large enough to permit a flower stem to pass through the aligned openings and small enough to support a flower blossom. The upper tray optionally comprises at least two opposed edge indentations adapted to facilitate removal of the tray assembly from the enclosure. The rectangular enclosure can be filled with water to a point below the level of the lower tray, and the tray assembly can be inserted with flowers pre-installed, or inserted empty with the flowers being added later. The removable lid may be applied to protect the flowers during transport and removed to display the flowers after delivery. Due to the shape of the container, it is suitable for uses with a wide variety of stem lengths.

The system and method for ordering flowers includes a server adapted to communicate wirelessly with a user computer and a recipient computer. A warehouse computer is adapted to communicate with the server and, preferably, also with a printer. The server is specially programmed to receive a flower order comprising a (preferably multimedia) message from the user computer. The warehouse computer is specially programmed to display the flower order to a warehouse worker and preferably print a card comprising a link to the multimedia message. The server is further adapted to receive the link from said recipient's computer and transmit the message back to the recipient in return.

In this way, a user may place a flower order using a computer, such as a mobile device, and a warehouse worker may view the flower order on the warehouse computer and assemble the flower order and ship it to the recipient. The recipient may then receive a personalized and, preferably, multimedia message from the server by accessing the link included with the flowers. Preferably, the flower container assembly described above may be used to ease shipping, lower costs and/or provide a pleasing visual appearance.

BRIEF DESCRIPTION OF THE DRAWINGS

These and other features in the invention disclosed herein will become apparent from the following detailed description of illustrative embodiments thereof, which is to be read in connection with the accompanying drawings, which illustrate certain preferred embodiments wherein.

DETAILED DESCRIPTION

Figure 1:
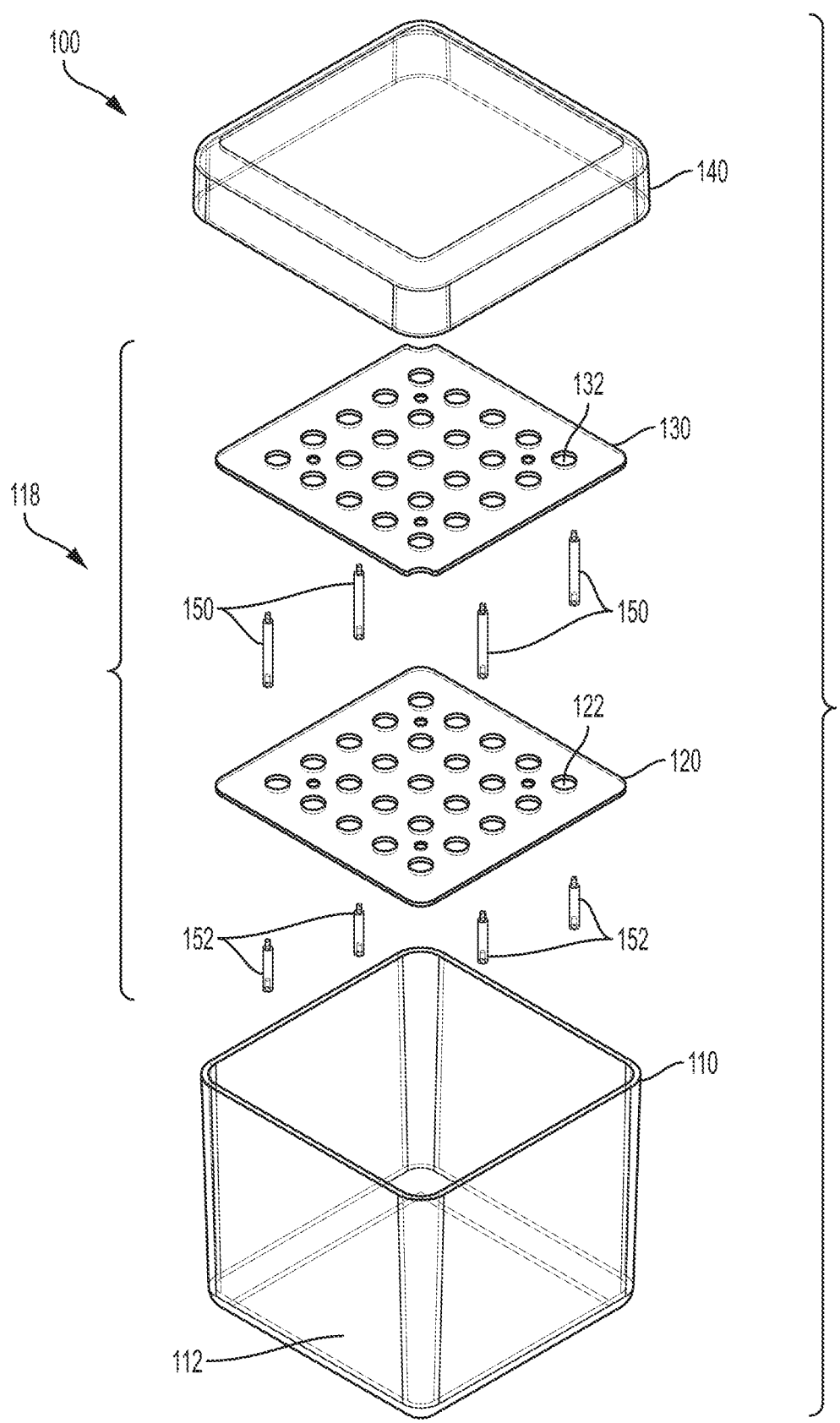
FIG. 1 is an exploded perspective view of a translucent rectangular enclosure containing a removable tray assembly comprising two stackable trays suitable for arranging flowers and a translucent rectangular lid.

While the following describes certain preferred embodiments of apparatuses, systems and methods according to the present invention, it is understood that this description is to be considered only as illustrative of the principles of the invention described herein and is not to be limitative thereof. Numerous other variations, all within the scope of the claims, will readily occur to those of ordinary skill in the art.

It will be noted that in the illustrated embodiments, different embodiments comprise the same or similar components. Where components in different embodiments have a similar structure, but are not necessarily common parts, the components have element numbers with different first digits, but common second and third digits. Where the same element numbers are used, the drawing illustrates uses of multiple copies of essentially the same component or feature, showing that the same component may be reused in more than one embodiment or context.

As used herein, the term "adapted" means sized, shaped, configured, dimensioned, oriented and arranged as appropriate when used in connection with a physical item, and means specially programmed, connected and configured as appropriate when used in connection with a programmable device such as a computer.

The term "computer" as used herein refers to any device or apparatus capable of executing software instructions and communicating with other computing devices over a network such as a local area network, wide area network, close area network, etc. Examples of computers, without limitation, may include servers such as webservers, laptop computers, desktop computers, tablets, smartphones, and smart watches. The term "terminal" as used herein refers to a computer or an input/output apparatus (such as a touchscreen, display and keyboard, etc.) connected to a computer.

The term "translucent" as used herein refers to both transparent and translucent.

The term "link" as used herein means an identifier for an item stored on a computer. Examples (without limitation) of links include uniform resource locators (URLs) either in fully qualified form or in a shortened form that utilizes redirection, a bar code encoding a URL, a quick response (QR) code encoding a URL or fully-qualified location, or a graphic, number or string (or combination thereof) that is recognizable by a computer as being associated with, and uniquely identifying, a stored item. It will be understood that a link need not be fully qualified and may, instead, provide only a unique identifier through which a fully qualified location or URL or similar fully-qualified location may be looked up in a file, table or database. In such uses, a barcode or QR code may encode an identifier and software receiving that identifier may implement a lookup in order to identify the URL or other fully qualified resource locator. Alternatively, a radio frequency identifier (RFID) tag may be used where the value in the tag is stored with an association to the URL. Alternatively, a near field communication (NFC) chip or device may be programmed to provide an identifier or a URL or location. As a still further alternative, a code or identifier (e.g. a 6 character retrieval code) may be entered by a user through a web page or custom serve and sent to a server which can then map that code to a URL or other location. Regardless of the technology or format used, the link (in the form of printing on a card or other item) or in the form of a physical RHD tag or NFC chip or similar device provides a unique identifier for an item on a computer either directly or through indirection.

The definitions and meanings of other terms herein shall be apparent from the following description, the figures, and the context in which the terms are used.

FIG. 1 is an illustration of a preferred embodiment of a rectangular flower container assembly 100 suitable for shipping, delivering, and displaying flowers. The components may be constructed of a translucent material such as acrylic. In an alternate embodiment, the material may be a polycarbonate such as Lexan®. It is understood that many translucent materials may be suitable for this embodiment and that those listed are exemplary only. Enclosures that are not translucent, or that have only one translucent portion, may also be used. In such embodiments either the translucent portion would be positioned such that internal flowers may be seen or a lid or flap would could be used to gain access to internal flowers. Materials that can hold liquids such as water are preferred so that the container can serve both as a transportation container and also as a longer term display apparatus. It is noted, however, that the removable tray assembly 118 (discussed below) is removable, meaning that it may be removed and placed, for example, in a tray (not illustrated) or in lid 140, for display of the flowers after delivery. In such embodiments the tray (not illustrated) or lid 140 may be constructed of material capable of containing liquids while other portions of the structure are not. In this way it is understood that the flowers may be displayed in the container when delivered, or may be removed in the tray assembly 118 for display outside of the container.

It is further understood that the shapes of the enclosure disclosed and represented are exemplary only, and that many shapes of enclosures are within the scope of the invention and afford similar benefits. For example, and without limitation, while the shape shown is roughly cubical, rectangular shapes may also be used, as can more creative shapes such as diamonds or stars. Rectangular shapes (which include but are not limited to cubical shapes) are desirable where shipping or display of multiple containers is required as they allow space-efficient stacking on a pallet or in a container. Where such containers are used, the dimensions of the containers may be customized to fit a predetermined amount on a standard pallet or in a standard container size to improve shipping efficiency and reduce the need to padding material. As illustrated, rectangular enclosure 110 may be 8 inches wide by 8 inches long by 8 inches high, with a wall thickness of 9 millimeters. In alternate embodiments the bottom 112 may have an unequal length and width and the height of rectangular enclosure 110 may be different from its length, width or both.

As is noted above, shapes and dimensions can be customized for shipping purposes. For example, a cube shaped embodiment of the enclosure may have an overall width of 8.836 inches and a height of 7.909 inches. An enclosure of this embodiment may be stacked 200 to a single 40 inches by 48 inches pallet. Further, utilizing this size of pallet loaded with 200 units of this embodiment, a 20' shipping container could hold approximately 20,000 units. A 40' shipping container could hold approximately 40,000 units. This is significant, because some flowers, such as roses, are often shipped in bulk from growers in places such as South and Central America.

When shipped in bulk, some species of flowers may naturally enter a dormant state due to lack of hydration, while others may be dried and chilled to encourage them to enter dormant state for shipping. They then remain dormant until they are provided with water, which allows them to achieve their desired characteristics. Such flowers may be shipped in bulk, such as bundled in boxes or bales. One advantage of certain embodiments of the present invention is that the flowers can be directly inserted into the flower container prior to shipping from the grower and held in place by the openings in the trays prior to becoming dormant. In this way, the flowers can be pre-inserted into enclosures, go dormant or be encouraged to go dormant, and then shipped in large volumes using pallets and shipping containers as discussed above. Once the flowers reach their intended destination, all that remains is to add water to the flower container to rejuvenate them prior to delivery to the end recipient. Once water is added to the flowers in the container, they will achieve their typical color and size.

This mode of shipping may provide the advantage of not having to handle the flowers after their initial deposit in the container by the growers, and eliminates the need for a person to select and arrange flowers in a different container after receiving a bulk shipment and prior to delivery. Pre-filled containers can then be prepared for delivery by adding water and a card or other means of delivering a personalized greeting. If grooming is required prior to delivery, the removable tray assembly 118 allows for removal of the flowers as a unit to enable removing of outer petals by simply removing removable tray assembly as part of the final assembly and shipping procedure.

A further advantage of embodiments of the apparatus provides for a significant increase in the source of flowers, as the height of the apparatus allows a greater variety in the height of the flowers to be placed in the apparatus and eliminates the need of 'long stems.' This creates a cost advantage as certain flowers, like roses, currently have a premium on long-stems whereas the shorter roses are considered to be undesirable or scrap.

The reductions in handling and scrap may increase the quality of the flowers and reduce the amount of flowers which must be disposed of due to damage or mishandling. It also may allow for a more efficient and cost-effective delivery model as described above. Further advantages of embodiments of the present invention may be a reduction in the need to hire additional workers to unpack, water, and arrange the flowers into vases or other delivery vessels. In a further embodiment, a grower or wholesale flower merchant may ship directly to customers or delivery vendors without the need for a local retailer or local delivery personnel, thereby still further reducing costs, with instructions to simply add water.

Flower container assembly 100 as illustrated includes removable tray assembly 118, which has upper tray 130 and lower tray 120. While a two-tray embodiment is illustrated, additional trays can be added to the assembly if needed for support or protection of the flowers or other items and single-tray embodiments are possible. Removable tray assembly 118 further comprises upper removable separating posts 150 which separate lower tray 120 and upper tray 130 and lower separating posts 152 which raise lower tray 120 off the bottom 112 of rectangular enclosure 110. When assembled, removable tray assembly 118 thus forms a removable structure for supporting flowers that fits neatly within rectangular enclosure 110 and allows lid 140 to rest on rectangular enclosure 110 without touching flowers 101 (see FIG. 2). In some embodiments, lid 140 may have a snug fit over the enclosure so that it may not lift inadvertently and will help avoid water loss if flowers are transported with water. In other embodiments not illustrated, a plug-fit or flush-fit lid may be used. Where lid fit is not particularly snug, a retaining device such as a band may be used to secure lid 140 for shipping. The size and configuration of lid 140 can be advantageous in some situations as it may be removed and used as a base for removable tray assembly 118, which allows removal of the flowers from enclosure 110 without the need for a separate vase.

Figure 2:
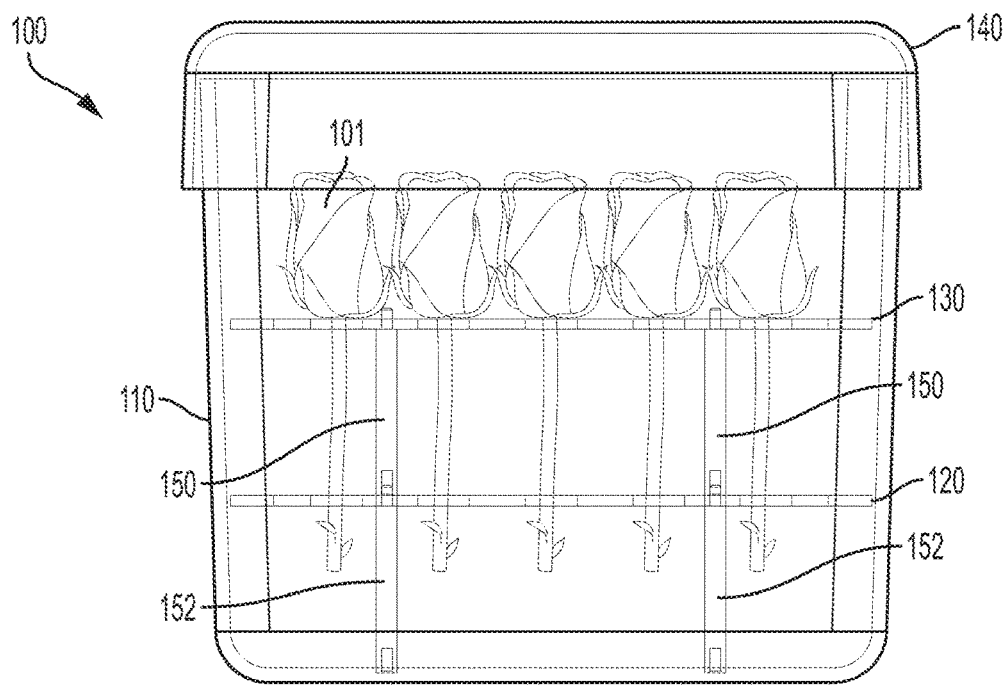
FIG. 2 is a side view of the embodiment illustrated in FIG. 1, showing the container filled with flowers.

FIG. 2 illustrates flower container assembly 100 in assembled form, holding flowers 101. As illustrated, the translucent nature of the illustrated embodiment allows flowers 101 to be viewed from any angle, creating a pleasing display and allowing for retail store displays with stacked containers that still allow shoppers to see the contents of lower containers through the side, if not through the top.

Figure 3:
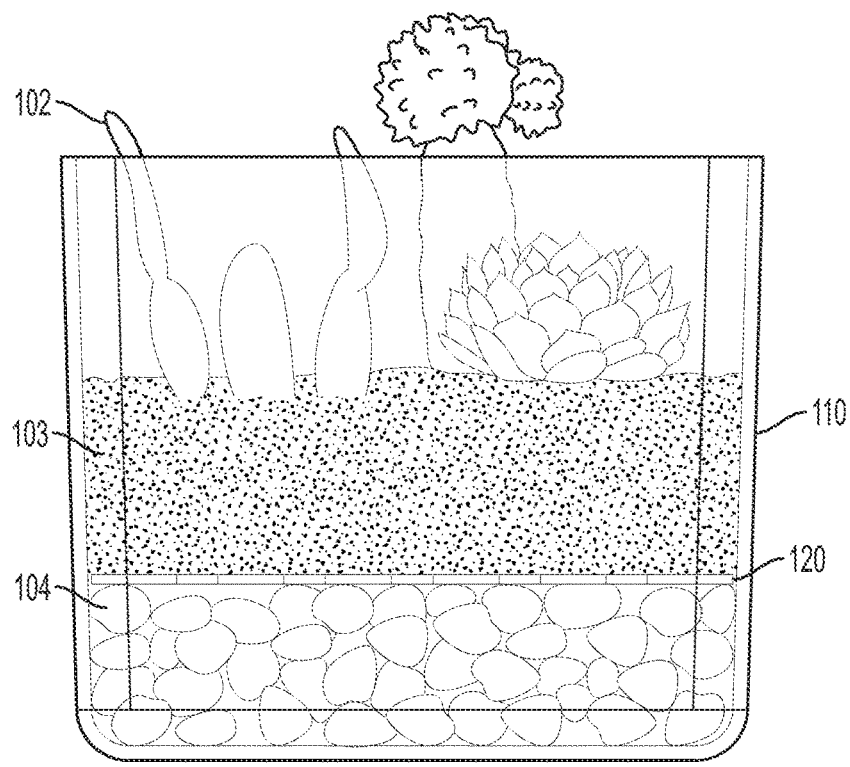
FIG. 3 is a side view of the embodiment illustrated in FIG. 1 with the container repurposed as a planter for live plants.

FIG. 3 shows an example of flower container assembly 100 having been repurposed after flowers 101 have expired.

Typically, flower container assembly 100 will be used to display flowers 101 throughout their shelf life. After flowers 101 have expired, flower container assembly 100 may be repurposed for any number of uses including, without limitation, by using it as a pen holder, brush holder, or a holder of any items with an extending portion that can be supported by removable tray assembly 118. Alternatively, as illustrated in FIG. 3, removable tray assembly 118 may be removed and disassembled, retaining lower tray 120 only. Then rectangular enclosure 110 can be partially filled with rocks or pebbles 104 to provide for drainage from roots, lower tray 120 may be reinserted, soil 103 may be added, together with plants 102 to form a raised planter structure with good drainage for watering and a pleasing appearance due to the preferably translucent nature of rectangular container 110. Other uses are also possible, including, without limitation, using rectangular enclosure 110 without removable tray assembly 118 as a storage box (with or without lid 140) or as a fishbowl, or terrarium, etc.

Figure 4:
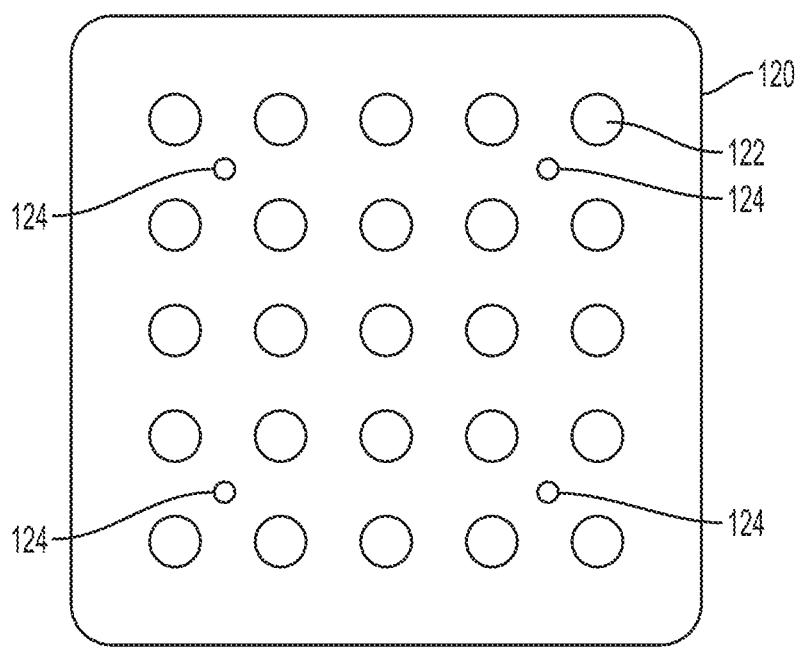
FIG. 4 is a top view of the lower tray from the removable tray assembly of the embodiment illustrated in FIG. 1.

FIG. 4 illustrates lower tray 120 in more detail. Openings 122 are adapted to allow a flower stem to pass through, preferably without touching the opening sides. Openings 122 as illustrated are in the form of a grid pattern allowing the display of 25 flowers in a pattern of five rows and five columns. Lower tray post holes 124 allow for assembly with lower removable separating posts 152 (discussed below) to support lower tray 120. It will be noted that during shipping and display of flowers, openings 122 provide separation and organization of flower stems. When repurposed as a planter (as illustrated in FIG. 3), openings 122 provide excellent drainage with enough structure to support soil. Lastly, referring to FIG. 2, it is noted that the position of lower tray 120 provides a visual line when viewed through rectangular enclosure 110 that helps divide flower container assembly into sections when viewed from the side and provides a visual reference for filling with water, which will typically remain at a level below or adjacent to lower tray 120

Figure 5:
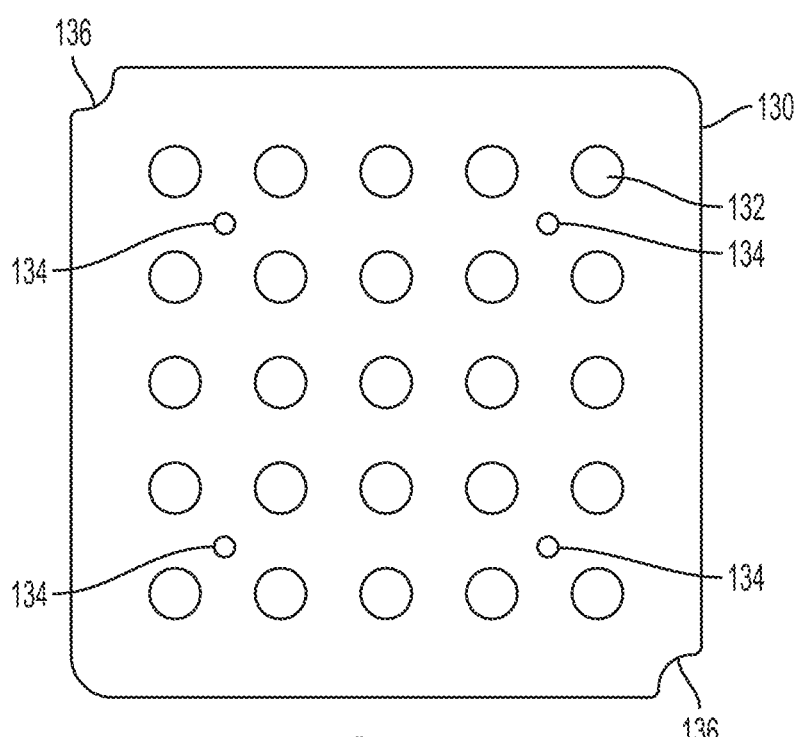
FIG. 5 is a top view of the upper tray from the removable tray assembly of the embodiment illustrated in FIG. 1.

FIG. 5 similarly illustrates upper tray 130. Upper tray 130 may be identical to lower tray 120 to reduce the number of parts retained in inventory. As illustrated, however, upper tray 130 includes edge opposed indentations 136 adapted to allow a user to insert fingers between upper tray 130 and rectangular enclosure 110 (shown in FIG. 1). Alternatively, a ribbon, string or cord (not illustrated) could be looped under upper tray 130 through indentations 136 or openings 132 to further facilitate lifting out tray assembly 118. Similar to lower tray post holes 124 in FIG. 4, upper tray post holes 134 in upper tray 130 are adapted to engage upper removable separating posts 150, shown in FIG. 6 and described further below. Upper openings 132 are adapted to be large enough to allow the stem of a flower to pass through, but small enough to support the flower by its blossom or bulb. In this way flower stems do not need to reach to the bottom 112 of container 110 as is shown in FIG. 2. Preferably openings 122 and 132 will be of the same size and shape. The shape of openings 122 and 132 (i.e., circular, oval, square, etc.) is a matter of choice.

When removable tray assembly 118 is assembled, openings 122 and 132 will preferably be aligned to allow a flower stem to pass through both openings as is illustrated in FIG. 2. It will be noted that the configuration of openings 122 and 132 may be varied to allow for displays of different sizes. For example, and without limitation, a four by four or three by four pattern could be used to provide an enclosure with fewer flowers per container or to allow for flowers with larger blossoms or bulbs. Making removable tray assembly 118 (shown in FIG. 1) in this manner allows the same rectangular enclosures 110, lids 140, upper removable separating posts 150, and lower removable separating posts 152 to be used with different tray configurations, thereby providing choice and flexibility for the buyer or retailer. Patterned configurations of openings may also be used instead of straight rows to provide further choice and variety for flower displays.

Figure 6:
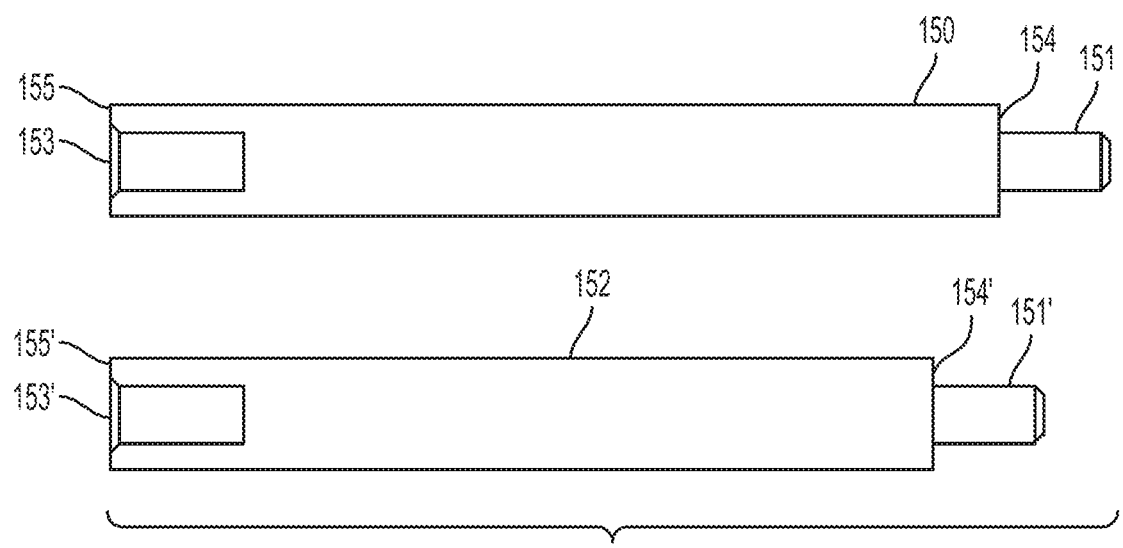
FIG. 6 is a side few view of the upper and lower separating posts from the removable tray assembly of the embodiment illustrated in FIG. 1.

Upper removable separating post 150 and lower removable separating post 152 are shown in more detail in FIG. 6. Upper removable separating post 150 has first longitudinally opposed end 154 and second longitudinally opposed end 155. Extension 151 extends from first longitudinally opposed end 154 and has a cross section that is less than the cross section of upper removable separating post 150 and is preferably tapered slightly at its outer end to ease alignment tolerances during assembly. Second longitudinally opposed end 155 comprises void 153 that is adapted to receive an extension having the same size as extension 151. Similarly, lower removable separating post 152 has extension 151' on first longitudinally opposed end 154' and void 153' on second longitudinally opposed end 155'. By making extension 151 in substantially the same dimensions as extension 151', and making void 153 in substantially the same dimensions as void 153', assemblies can be created by inserting extensions 151 and 151' into voids 153 and 153' in various combinations. By making extensions 151 and 151' longer than the thickness of lower tray 120 and upper tray 130, and having substantially the same cross section as lower tray post holes 124 and upper tray post holes 134, removable tray assembly 118 can be formed. Preferably, voids 153 and 153' will be slightly tapered or will have a slightly smaller diameter or will include other retention features known in the art such that once extensions 151 or 151' are inserted, they are held snugly so that removable tray assembly 118 may be moved, filled, and inserted into rectangular enclosure 110 without falling apart. Further, it is noted that with the illustrated design, upper removable separating posts 150 and lower removable separating posts 152 may be manufactured in a variety of lengths making it possible to easily create removable tray assemblies 118 of differing heights.

Figure 7:
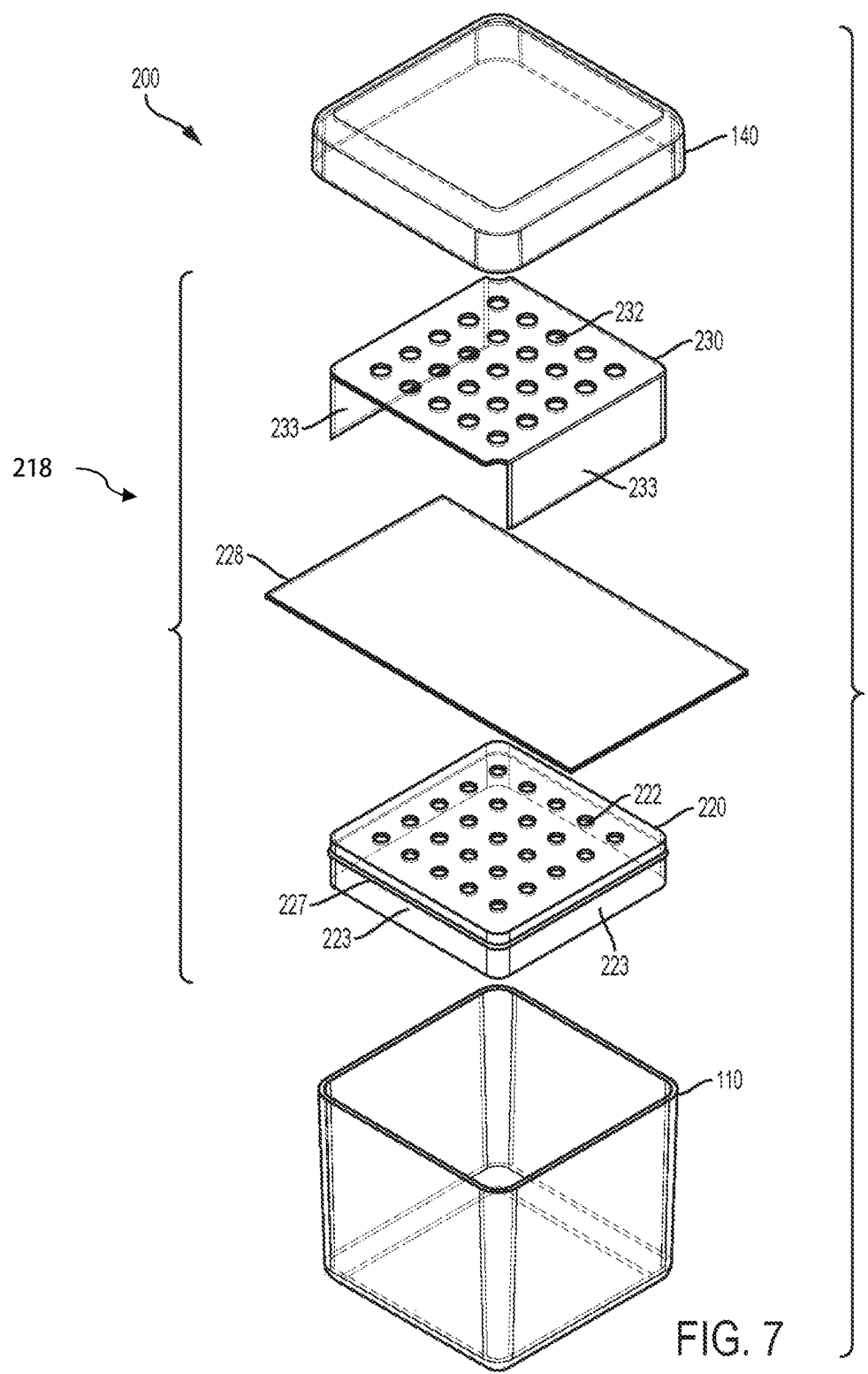
FIG. 7 is an exploded perspective view of an alternate embodiment of a translucent rectangular enclosure containing a removable tray assembly comprising two stackable trays suitable for arranging flowers.
Figure 8:
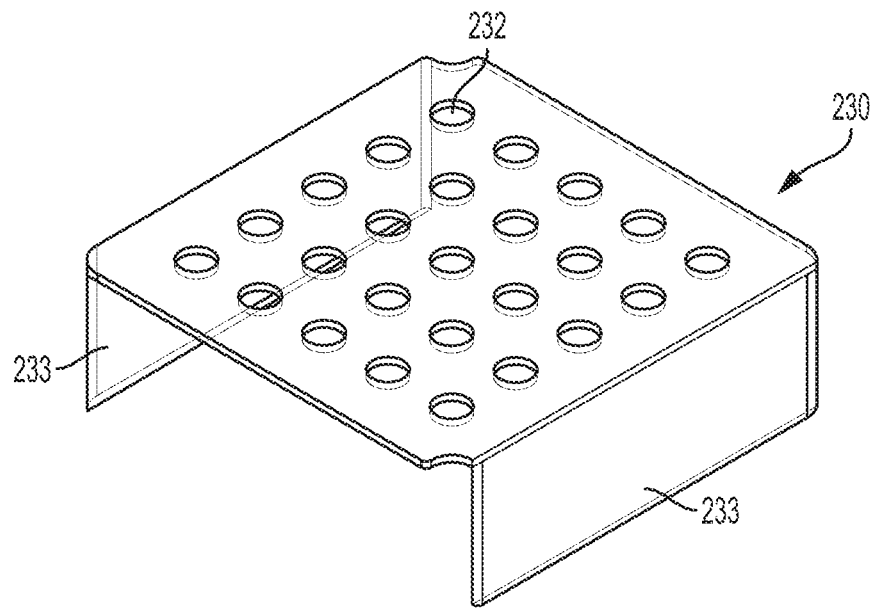
FIG. 8 is a perspective view of the upper tray in the removable tray assembly of the embodiment shown in FIG. 7.
Figure 9:
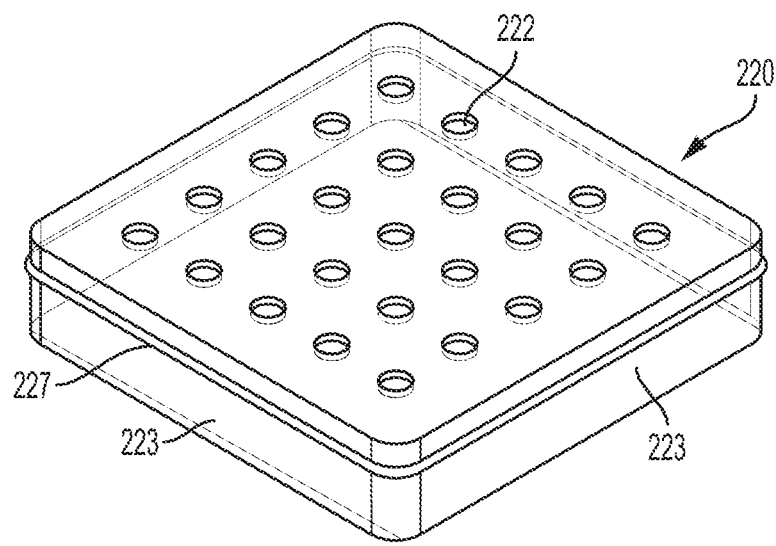
FIG. 9 is a perspective view of the lower tray of the removable tray assembly in the embodiment shown in FIG. 7.

Referring now to FIG. 7-9, an alternate embodiment of flower container assembly 200 is shown. Lid 140 and rectangular enclosure 110 are as previously described. Removable tray assembly 118 (shown in FIG. 1), however is replaced with removable tray assembly 218, which comprises lower removable tray 220, gasket 227, sheet 228, and upper removable tray 230. Upper removable tray 230 comprises openings 232. It further comprises upper tray downward extending sides 233 instead of upper removable separating posts 150 shown in FIG. 1. While two downward extending sides 233 are illustrated, those familiar with the art will appreciate that four downward extending sides 233 may also be used.

Lower removable tray 220 as illustrated comprises four downward extending sides 223, and openings 222 which, when assembled, will align with openings 232 and, preferably will be similarly dimensioned. Gasket 227 extends around the four downward extending sides 223. Preferably gasket 227 will be in the form of an elastic loop of a material such as rubber, similar to a rubber band. During assembly, gasket 227 is expanded and placed over lower tray 220. The elastic tension created by expanding gasket 227 retains gasket 227 in place. A valley (not illustrated) or small ridges (also not illustrated) could be added to receive gasket 227 and hold it more securely if necessary. Gasket 227 provides an improved seal between lower tray 220 and the sides of rectangular enclosure 110 to reduce or eliminate spillage, splashing or leakage of water during shipping.

As a further method of reducing spillage, splashing or leakage of water, sheet 228 may be placed over lower tray 220 prior to the application of gasket 227. Sheet 228 may be a pliable plastic membrane that can be pierced by a flower stem when the flower stem is inserted. Certain materials such as a pierce-able polymeric membrane have the additional property of sealing around a piercing flower stem to create an improved seal. One such material is Laticrete Aquacel®. Other materials known in the art, however, can also be used, with varying levels of seal being created when flowers are inserted. By dimensioning sheet 228 to cover the upper surface and two downturned sides 223 in a rectangular shape, sheet 228 can be wrapped over lower tray 220 without bulging at the corners. Sheet 228 may be held in place by gasket 227 or by a variety of means such as adhesives or mechanical clips (not shown). The end result is a lower tray 220 that can substantially form a seal such that water may be included underneath lower tray 220 prior to shipping without fear of splashing or loss in transit.

Figure 10:
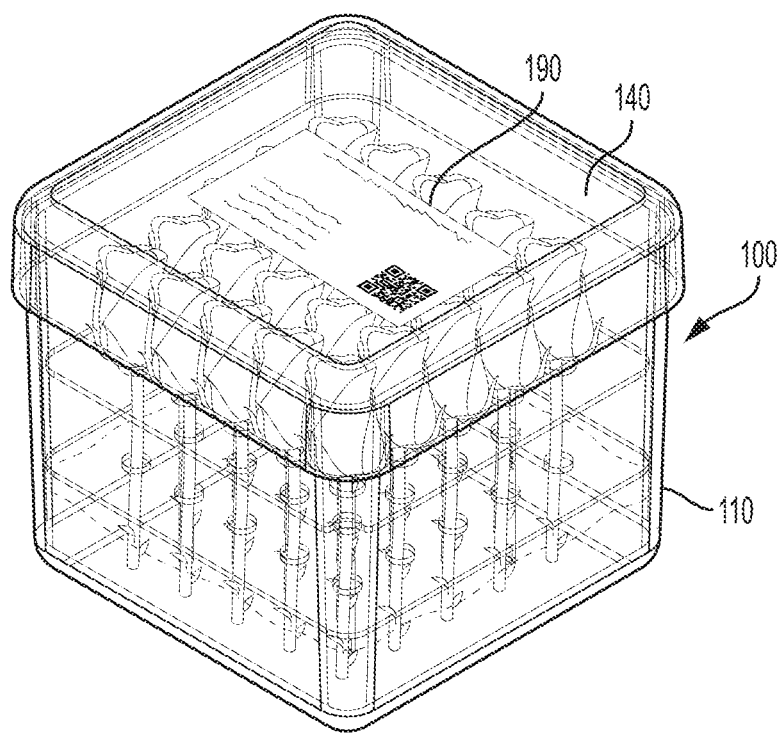
FIG. 10 is a perspective view of the embodiment shown in FIG. 1 filled with flowers and including a card viewable through the removable lid.
Figure 11:
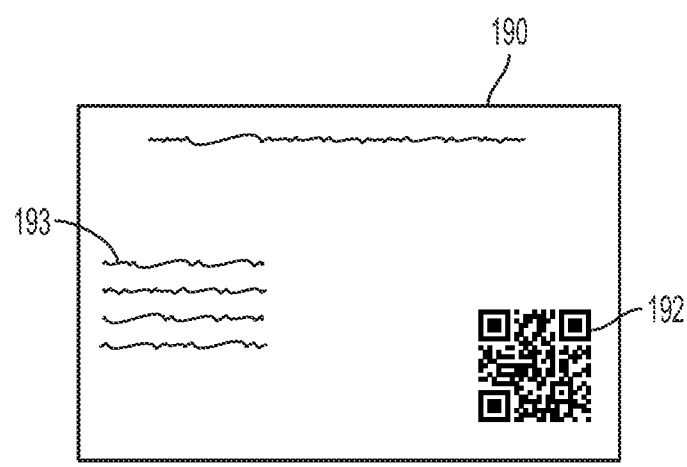
FIG. 11 illustrates the card included in the embodiment illustrated in FIG. 10.
Figure 12:
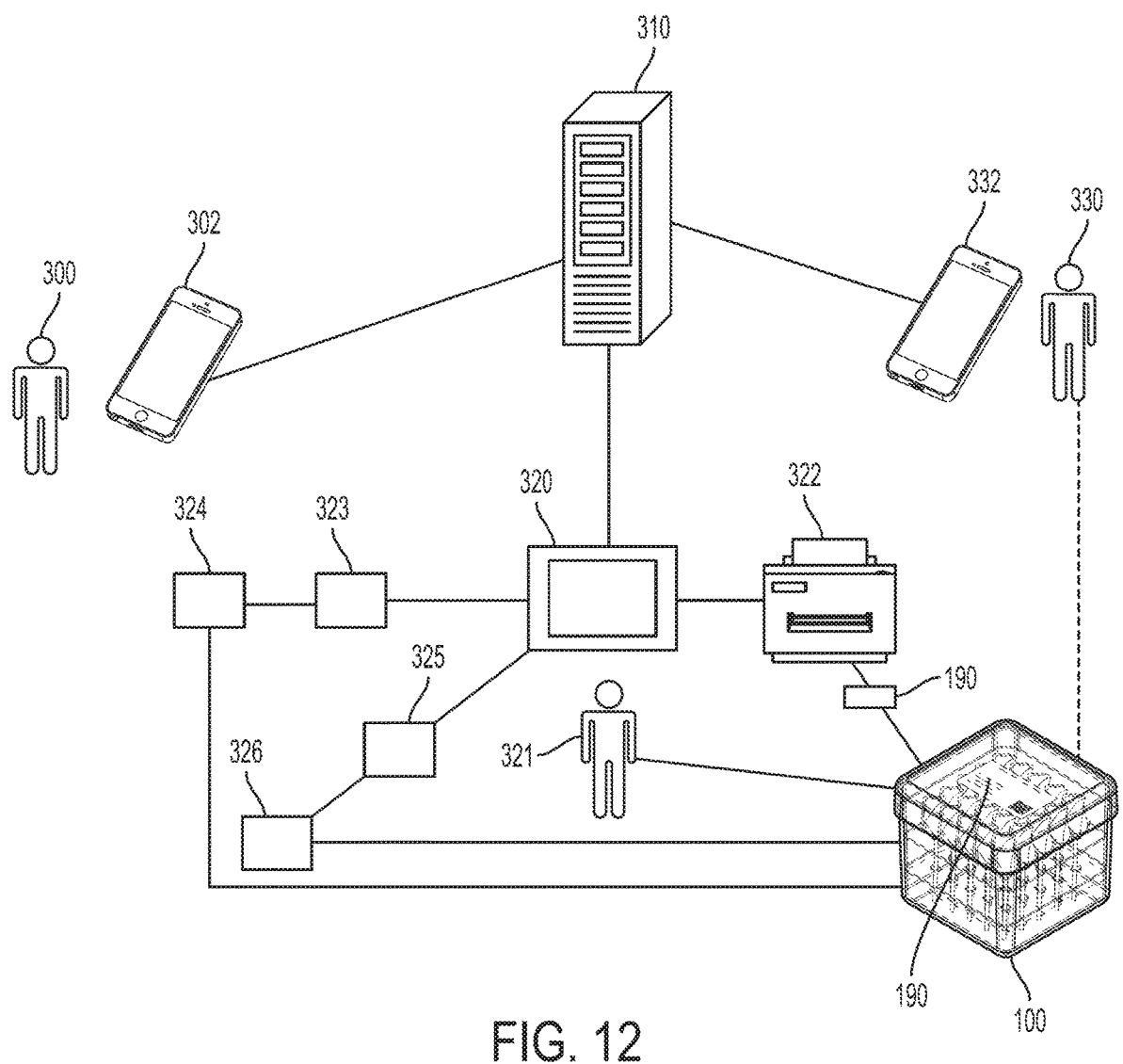
FIG. 12 is a schematic diagram illustrating components of an embodiment of a system for ordering and delivering flowers with customizable greetings.

Referring now to FIGS. 10-12, a method of including a customized greeting with flower container assembly 100 (or 200) is shown. Card 190 is placed on top of the flowers prior to placing lid 140. The translucent nature of lid 140 allows the contents of card 190 to be viewed prior to removing lid 140. Alternatively, if the message is intended to be kept private, card 190 may be placed in an envelope (not illustrated). It is also possible for card 190 (with or without an envelope) to be placed on top of lid 140, or at another location, with a small amount of adhesive, or displayed in a holder (not illustrated) attached to upper tray 130.

Card 190 may have a variety of content including writing 193 or pictures (not illustrated). Preferably, it will include link 192. While link 192 is illustrated as a QR code, it is understood that it can be any type of link (as described above). Where the link is in the form of an RFID tag (not illustrated) or NFC chip (not illustrated), it may be attached to the underside of card 190 with a small amount of adhesive or tape, or inserted elsewhere in the container assembly. The location of link 192 on card 190 is a matter of choice. As is explained further below, the purpose of link 192 is to allow the recipient of card 190 to use a computer to access the link and receive a personalized message.

A system is thus illustrated in FIG. 12, wherein a user 300 uses a user computer 302 to place an online order for flowers via server 310 through a wide area network such as the Internet. While any type of computer (as defined above) may be used, a smartphone is well-suited to use as computer 302. Server 310 is adapted to allow user 300 to place, track and pay for a flower order. Server 310 is also adapted to allow user 300 to create a customized personal message that may comprise pictures (either stock pictures or uploaded from user computer 302), text (either stock messages or uploaded from user computer 302), video (either stock video clips or uploaded from user computer 302 or recorded as a personal video message from user computer 302), and/or sound (either stock music or music or sounds uploaded from user computer 302). Server 310 then stores the video message in association with the flower order.

Server 310 makes the flower order available to warehouse computer 320. Warehouse computer 320 may be a specially programmed computer adapted to exchange information and data with server 310, or may be a terminal or computer capable of accessing server 310 through a local area or wide area network via a web browser interface. In this way, flower orders are displayed to warehouse worker 321 who is charged with preparing and assembling flower container assembly 100 for shipping to recipient 330. It will be understood that, while not separately illustrated, flower container assembly 200 may also be assembled and shipped in this manner. It will further be understood that "assemble" in this context can mean (i) adding flowers to the enclosure followed by adding of any greeting or selecting a pre-loaded enclosure and adding a greeting, (ii) grooming the flowers if needed, (iii) adding water if needed, and (iv) packaging or otherwise making ready for shipping.

Upon receipt, recipient 330 may use recipient computer 332 to follow a link 192 on card 190. As with user computer 302, recipient computer 332 may be any type of computer (as defined above), with the understanding a smartphone is particularly well suited for use as recipient computer 332. Scanning or receiving or entering link 192 will cause recipient computer 332 to communicate with server 310. Server 310 will then be specially programmed to deliver the customized message associated with the flower order to recipient computer 332 for display using any of a variety of industry-standard formats such as, but not limited to, html, mp3, mp4, etc. Where only text is desired, an SMS message may be pushed from server 310 to recipient computer 332 as well.

Server 310 will preferably be specially programmed to enable user 330 to respond using recipient computer 332 with a response message which may be in any of the forms used for the original message including without limitation a multimedia message or a simple text message. User 330 will create the message using recipient computer 332 and server 310 will either push the message to user notify user 300 (e.g through an application alert, SMS message, email or other electronic message) or will store the message for later pickup. In either event, user 300 may use user computer 302 to receive the response message. Where desired, the recipient may order a return gift for user, which would then be processed or shipped in the same manner described.

Where the link 192 included with card 190 comprises only text, barcode characters, or a QR code, printer 322 connected to warehouse computer 320 may be used to create card 190, in addition to printing shipping labels if needed. Where an RFID tag is used. RFID tag 326 may be selected by warehouse worker 321 and read with optional RFID reader 325, connected to warehouse computer 320. In such instances warehouse computer 320 (or server 310 where warehouse computer 320 is merely a terminal) may be specially programmed to then associate the RFID value from RFID tag 326 with the flower order. Warehouse worker 321 may then attach RFID tag 326 to card 190 or elsewhere on flower container assembly 100. Recipient computer 332 may then read the RFID tag 326 in order to access the customized message from server 310.

Similarly, a NFC chip may be used to provide a link 192. In such embodiments, warehouse worker 321 will select an unprogrammed NFC chip 324 and warehouse computer 320 (or server 310 where warehouse computer 320 is a terminal) will cause NFC chip programmer 323 to include either the custom message or a link to the custom message for that order. Warehouse worker 321 can then attach NFC chip 324 to card 190 or elsewhere on flower container assembly 100. Recipient computer 332 may then read the NFC chip 324 to display the customized message, or provide the link 192 to server 310, which is specially programmed to display the customized message in response to the link 192.

Figure 13:
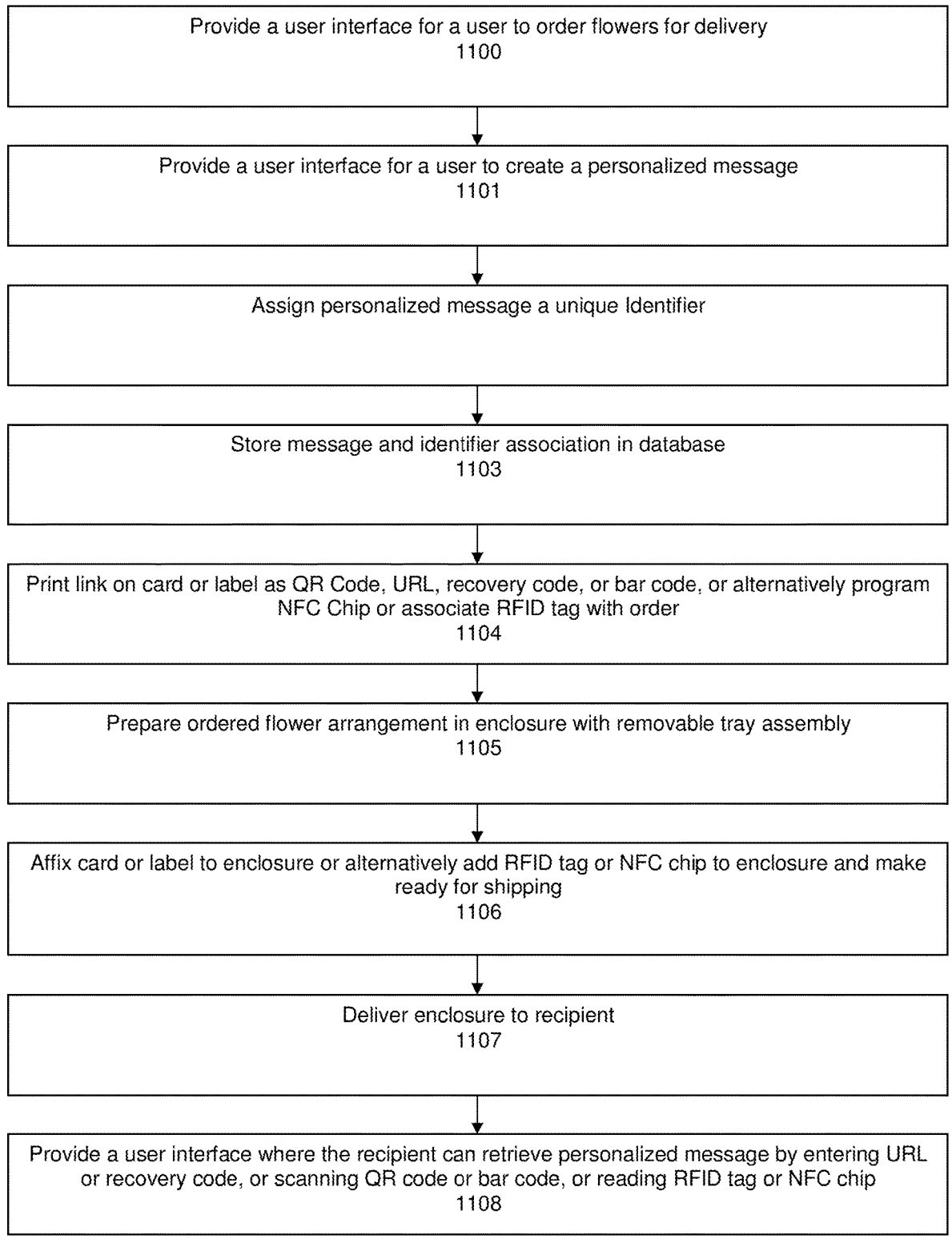
FIG. 13 is a method of delivering flowers to a recipient with a method to retrieve an electronic greeting, suitable for use in connection with the system embodiment illustrated in FIG. 12.

Referring to FIGS. 12 and 13, FIG. 13 illustrates the steps in an embodiment of a method of delivering flowers with a customized greeting suitable for use with the system of FIG.

12 and with flower container assembly embodiments such as are illustrated in FIGS. 2 and 7, as well as with other types of containers known in the art. In a preferred exemplary embodiment, a user 300 would create an order through an ordering and delivery application or website. According to step 1100, server 310 in conjunction with user computer 302 may provide a user interface to user 300 to enable user 300 to create an order. The user interface may be provided as a web page or via communication to a mobile application (or App) installed on a smartphone or other portable device, typically through an App store such as those provided by Apple or Google. In the case of a web page interface, user computer 302 would merely provide a web browser and input/output capability, and server 310 would provide the remainder of the user interface including process flows. In the case of an App, the App will receive necessary information and data from server 310, and will display and receive that information through a locally-installed program.

Order creation may involve the creation of a user account or may be performed as a guest user. In either way, capturing and storage of at least an email address or mobile telephone number is appropriate where server 310 is to provide status updates or other communications to user 300 regarding the order. Order creation will further comprise selection of a product to be ordered (typically from an online catalog with pictures and descriptions), capturing of the name and address of the recipient, calculation of any additional shipping or delivery charges, processing of a credit card or other payment method (e.g. Paypal, electronic transfer, gift card, coupon, etc.), application of any promotional discounts, and provision of an order confirmation, typically through email.

In this way, it is understood that in the order process, customers may be given the option to create an original, personalized message comprised of a variety of media (i.e. text, audio, and video). According to step 1101, the user interface may allow for a personalized message to be associated with a specific order and intended recipient. The personalized message could be a selection from a set of stock messages, or an original-content recorded message, or a combination of stock elements. The personal message can be in the form of a text-only message (suitable for delivery by SMS), a picture, music, video, an e-card, or any combination thereof. In an exemplary embodiment, an App running on user computer 302 would provide the interface for creation of a video message by triggering a camera and microphone on user computer 302 to record a short video message. In an alternate exemplary embodiment, server 310 could provide a web-based interface for selecting stock pictures, stock music, stock video clips, stock e-cards, etc. and then personalizing them via web pages viewed on user computer 302. In a still further exemplary embodiment, user computer 302 could upload pre-created photographs, music clips, video clips or the like to server 310 for customization, or customize them locally, in order to generate the personalized message, which would then preferably be stored on server 310.

According to step 1102, server 310 may create a unique identifier for the video message and generate a link value such as a URL, 'bitly' (i.e. a shortened URL), bar code encoding of the identifier or URL, or QR code, for association between the personalized message and a location in a database or website. According to step 1103, the personalized message and identifier and/or link value are then stored, together with the location of the personalized message. Where indirection is used (i.e. where the link value is a unique identifier for a URL instead of a URL), then the link value may be a numerical or string value that identifies how to find the look up the location of the message (e.g. a key or unique identifier).

According to step 1104, where the link identifier is a URL, barcode, QR code, shortened URL or identifier, warehouse computer 320 will print the link 192 on card 190 using printer 322. While not referred to in FIG. 13, an additional step of associating an RFID value with the personalized message or programming a NFC chip may also be performed at this stage, as previously discussed.

According to step 1105, warehouse worker 321 may then prepare a flower assembly 100 according to the order. Preparation may involve selecting a pre-filled enclosure, grooming the flowers if needed, and filling with water. According to step 1106, card 190 is then placed in the flower container assembly 100 either by laying it on top of the flowers so it is viewable through the container from above, placing it in an envelope and laying it on top of the flowers, placing it in a holder and attaching the holder to the uppermost removable tray, or otherwise affixing it to the container.

According to step 1106, the link is added to card 190 or otherwise added to the enclosure. Where a visible link (e.g. a URL or QR code or a unique identifier/retriever) is used, card 190 may be printed with the link and attached to a greeting holder or placed on top of the flowers, or otherwise affixed, so that the link is visible without opening the container and, where QR scanning or a similar technology is used, can be scanned through the container. Alternatively, a link could be printed on a label and attached to the container. Where the link is not visible (i.e. cannot be printed), such as when an RFID tag or NFC chip is used, the link device may be affixed to card 190 prior to insertion (e.g. with adhesive or tape), or may otherwise be included with the enclosure as part of step 1106. Step 1106 then completes the order assembly process by packaging or otherwise preparing the flower container assembly for shipping.

According to step 1107, flower container assembly may be shipped or delivered to recipient 330. According to step 1108, after delivery, recipient 330 may use recipient computer 332 to retrieve the personalized message. For example, where the link identifier on card 190 is a QR code encoding the URL of the message file, the recipient may use a QR scanner application on recipient computer 332 to scan the QR code, download and play the message. Alternatively, where the personalized message is stored on a NFC chip, recipient 330 may use recipient computer 332 (presumably a device equipped with an NFC Chip reader) to retrieve the URL from the NFC chip and download and play the message, or to retrieve an identifier from the NFC chip and contact server 310 for the URL or for the message file directly. Where the message is a SMS message, contacting server 310 can result in server 310 delivering the SMS message directly to recipient computer 332. In such embodiments the SMS message could either be the personalized message or contain a hyperlink to the personalized message.

Following receipt of the personalized message, a recipient will be prompted, and may desire, to provide a thank you message in the same variety of media offerings. The recipient may then use the same interface by which they retrieved the personalized message to send a personalized thank you message to the original sender, which would reinitiate the process from the beginning, but without the necessity of creating an account or entering the contact information for the recipient. One exemplary embodiment may allow the original sender (user 300) to be notified on user computer 302 through a push notification or through e-mail, to then retrieve the thank you message.

Other variations and embodiments of the present invention will be apparent to those of ordinary skill in the art in light of this specification, all of which are within the scope of the present invention as claimed. Nothing in the foregoing description is intended to imply that the present invention is limited to any preferred embodiment described herein.

What is claimed is:

1. A flower container assembly comprising
a rectangular enclosure of translucent material comprising one open face;
a removable lid adapted to cover said open face;
a removable tray assembly comprising an upper tray and a lower tray;
said upper tray being spatially separated from and connected to said lower tray by a plurality of upper removable separating posts;
said lower tray being spatially separated from the bottom of said rectangular enclosure by a plurality of lower removable supporting posts;
said upper tray and said lower tray comprising a plurality of aligned openings adapted to be large enough to permit a flower stem to pass through said aligned openings and small enough to support a flower blossom;
said upper tray comprising at least two opposed edge indentations adapted to facilitate removal of said removable tray assembly from said rectangular enclosure
whereby said rectangular enclosure can be filled with water to a point below the level of said lower tray, said tray assembly may be inserted into said rectangular enclosure, flowers may be inserted into said aligned openings whereby the blossoms of said flowers are supported by said upper tray and the stems of said flowers pass through said lower tray into the water, and said removable lid may be applied to protect the flowers during transport and removed to display the flowers after delivery.

2. The flower container assembly of claim 1 further comprising a card, said card comprising a link to a personalized message stored on a server connected to a wide area network whereby upon opening said link the recipient of said flower container assembly may view said personalized message.

3. The flower container assembly of claim 2 wherein said link is selected from the group consisting of a QR code, a URL, an RFID transmitter, and an NFC tag.

4. The flower container assembly of claim 1 wherein
said upper removable separating posts comprise two longitudinally opposed ends, the first said longitudinally opposed end comprising an extension having a cross section smaller than the cross section of said removable separating post and the second said longitudinally opposed end comprising a void sized to receive an extension having substantially the same size and cross section of said extension;
said upper tray comprises upper tray post holes adapted to receive said extension on said upper removable separating posts and said lower tray comprises lower tray post holes adapted to receive said extension on said lower removable separating posts;
wherein said removable tray assembly may be assembled by inserting said extensions of said lower removable separating posts through said lower tray post holes into said voids on said upper removable separating posts and inserting said extensions on said upper removable separating posts into said upper tray post holes.

5. The flower container assembly of claim 4 wherein said upper removable separating posts and said lower removable separating posts are of different lengths.

* * * * *